(12) United States Patent
Gottwald et al.

(10) Patent No.: US 11,760,144 B2
(45) Date of Patent: Sep. 19, 2023

(54) WHEEL SUSPENSION FOR A MOTOR VEHICLE, IN PARTICULAR A PASSENGER VEHICLE, AND A MOTOR VEHICLE HAVING AT LEAST ONE SUCH WHEEL SUSPENSION

(71) Applicant: Daimler AG, Stuttgart (DE)

(72) Inventors: Martin Gottwald, Ulm (DE); Sven Mueller, Reutlingen (DE); Christian Mosler, Stuttgart (DE); Julian Schaefer, Stuttgart (DE)

(73) Assignee: Daimler AG, Stuttgart (DE)

( * ) Notice: Subject to any disclaimer, the term of this patent is extended or adjusted under 35 U.S.C. 154(b) by 26 days.

(21) Appl. No.: 17/632,740

(22) PCT Filed: Aug. 4, 2020

(86) PCT No.: PCT/EP2020/071889
§ 371 (c)(1),
(2) Date: Feb. 3, 2022

(87) PCT Pub. No.: WO2021/023738
PCT Pub. Date: Feb. 11, 2021

(65) Prior Publication Data
US 2022/0281276 A1    Sep. 8, 2022

(30) Foreign Application Priority Data
Aug. 8, 2019   (DE) ............... 10 2019 005 557.8

(51) Int. Cl.
*B60G 7/00*   (2006.01)
*B60G 3/20*   (2006.01)

(52) U.S. Cl.
CPC ............. *B60G 7/001* (2013.01); *B60G 3/20* (2013.01); *B60G 2206/017* (2013.01); *B60G 2206/10* (2013.01)

(58) Field of Classification Search
CPC .......... B60G 7/001; B60G 7/02; B60G 7/008; B60G 2202/12; B60G 2204/143;
(Continued)

(56) References Cited

U.S. PATENT DOCUMENTS 1,546,711 A * 7/1925 Brock .................... B60G 11/08
267/244
2,162,828 A * 6/1939 Slack ..................... B60G 7/02
411/389
(Continued)

FOREIGN PATENT DOCUMENTS

CN    105501017 A    4/2016
DE    42 05 366 A1   8/1993
(Continued)

OTHER PUBLICATIONS

PCT/EP2020/071889, International Search Report dated Oct. 12, 2020 (Three (3) pages).
(Continued)

*Primary Examiner* — Paul N Dickson
*Assistant Examiner* — Timothy Wilhelm
(74) *Attorney, Agent, or Firm* — Crowell & Moring LLP

(57) ABSTRACT

A wheel suspension for a motor vehicle includes a wheel linkage. The wheel linkage has a bearing region and a spring element. The wheel linkage has a first linkage arm with a first connecting element. A second linkage arm has a second connecting element. The second linkage arm has a first longitudinal region having the second connection element and a second longitudinal region attached to the first longitudinal region and disposed between the bearing region and the first longitudinal region. The second longitudinal region is offset in relation to the bearing region and the first
(Continued)

longitudinal region downwardly in a vertical direction of the motor vehicle in an installation position of the wheel suspension.

8 Claims, 11 Drawing Sheets

(58) Field of Classification Search
CPC .......... B60G 2204/148; B60G 2206/10; B60G 2206/123; B60G 2200/132; B60G 2204/41; B60G 2206/121
See application file for complete search history.

(56) References Cited

U.S. PATENT DOCUMENTS

| | | | | |
|---|---|---|---|---|
| 2,334,597 | A * | 11/1943 | Badertscher | B60G 15/062 267/222 |
| 2,351,291 | A * | 6/1944 | Ross | B60G 11/16 403/224 |
| 3,974,892 | A * | 8/1976 | Bolger | B62K 25/286 180/227 |
| 4,457,393 | A * | 7/1984 | Tamaki | B62K 25/283 267/173 |
| 4,815,556 | A * | 3/1989 | Sumimoto | B60G 3/22 180/311 |
| 5,286,052 | A * | 2/1994 | Lukianov | B60G 3/26 280/124.134 |
| 5,597,171 | A * | 1/1997 | Lee | B62D 17/00 280/124.138 |
| 5,810,383 | A * | 9/1998 | Anderson | B62K 5/027 280/93.505 |
| 5,954,352 | A * | 9/1999 | Rumpel | B60G 7/001 280/124.135 |
| 6,378,885 | B1 * | 4/2002 | Ellsworth | B62K 25/30 280/284 |
| 6,945,547 | B2 * | 9/2005 | Ackley | B60G 7/02 280/124.153 |
| 7,066,481 | B1 * | 6/2006 | Soucek | B62K 25/286 280/284 |
| 7,625,000 | B2 * | 12/2009 | Campbell | B60G 3/12 280/124.135 |
| 8,267,416 | B2 * | 9/2012 | Allen | B60G 3/20 280/124.135 |
| 8,882,127 | B2 * | 11/2014 | Colegrove | B62K 25/286 280/284 |
| 9,162,546 | B2 * | 10/2015 | Girelli Consolaro | B60G 21/0551 |
| 9,233,587 | B2 * | 1/2016 | Korte | B60G 7/001 |
| 9,643,464 | B2 * | 5/2017 | Zandbergen | B60G 3/20 |
| 9,731,573 | B2 * | 8/2017 | Suzuki | B60G 7/001 |
| 9,738,130 | B2 * | 8/2017 | Suzumori | B60G 7/001 |
| 9,776,466 | B2 * | 10/2017 | Battaglia | B60G 3/18 |
| 9,855,808 | B2 * | 1/2018 | Suzumori | B60G 7/001 |
| 9,931,903 | B2 * | 4/2018 | Eismann | B60G 11/183 |
| 10,118,452 | B2 * | 11/2018 | Drotar | B60G 7/008 |
| 10,239,374 | B2 * | 3/2019 | Jansen | B60B 35/007 |
| 10,759,243 | B2 * | 9/2020 | Hacker | B60G 7/008 |
| 10,870,181 | B2 * | 12/2020 | Hayashida | B25B 11/02 |
| 10,940,729 | B2 * | 3/2021 | Meier | B60G 3/28 |
| 11,072,215 | B2 * | 7/2021 | Drotar | B60G 7/008 |
| 2011/0210528 | A1 * | 9/2011 | Haas | B60G 7/001 280/124.128 |
| 2020/0282788 | A1 * | 9/2020 | Wolf-Monheim | B60G 13/003 |

FOREIGN PATENT DOCUMENTS

| | | |
|---|---|---|
| DE | 10 2007 041 731 A1 | 3/2009 |
| DE | 10 2012 110 080 A1 | 4/2014 |
| FR | 2 718 084 A1 | 10/1995 |
| JP | 2017-7455 A | 1/2017 |
| WO | WO 2011/101654 A1 | 8/2011 |
| WO | WO 2016/198865 A1 | 12/2016 |

OTHER PUBLICATIONS

German-language German Office Action issued in German application No. 10 2019 005 557.8 dated Jun. 22, 2020 (Six (6) pages).

* cited by examiner

WHEEL SUSPENSION FOR A MOTOR VEHICLE, IN PARTICULAR A PASSENGER VEHICLE, AND A MOTOR VEHICLE HAVING AT LEAST ONE SUCH WHEEL SUSPENSION

BACKGROUND AND SUMMARY OF THE INVENTION

The invention relates to a wheel suspension for a motor vehicle, in particular for a passenger vehicle. Furthermore, the invention relates to a motor vehicle, in particular a passenger vehicle.

DE 10 2012 110 080 A1 discloses a multi-link motor vehicle axle for connecting a wheel carrier to a motor vehicle chassis having linkages positioned on a linkage plane and having a trapeze linkage positioned on a second linkage plane.

Furthermore, DE 42 05 366 A1 discloses a rear axle suspension for a motor vehicle. A double wishbone wheel suspension is known from FR 2 718 084 A1. Moreover, U.S. Pat. No. 5,810,383 A discloses a suspension for a vehicle.

The object of the present invention is to create a wheel suspension for a motor vehicle and a motor vehicle, such that a particularly advantageous wheel guide can be implemented in a particularly cost-effective, weight-saving and manoeuvrable manner which is also favourable in terms of installation space.

A first aspect of the invention relates to a wheel suspension for a motor vehicle preferably formed as a passenger vehicle. This means that the motor vehicle, in its completely manufactured state, comprises the wheel suspension. The wheel suspension has at least one wheel linkage provided or formed for guiding in particular at least or exactly one wheel of the motor vehicle. The wheel linkage is simply referred to as a linkage or axle linkage and is used to guide the wheel, in particular in relation to a body of the motor vehicle. In other words, the motor vehicle, in its completely manufactured state, has the wheel and the body, which is preferably formed as a self-supporting chassis. Here, the wheel is a ground contact element, via which the motor vehicle, in its completely manufactured state, can be supported or is supported downwardly on an in particular horizontal ground. If the motor vehicle is driven along the ground, while the motor vehicle is supported downwardly on the ground via the wheel in the vertical direction of the vehicle, then the wheel rolls over the ground. Moreover, the wheel here rotates around a wheel axis of rotation in relation to the body. The wheel linkage allows relative movements between the wheel and the body, for example in at least one first direction, such that the wheel can compress and decompress, for example as part of these relative movements in relation to the body. However, in at least one second direction, the wheel linkage limits or prevents unwanted relative movements between the wheel and the body. In the event of a compression movement or when the wheel compresses, the wheel moves upwardly in relation to the body in the vertical direction of the vehicle, for example. With a decompression movement or when decompressing, the wheel moves downwardly in relation to the body in the vertical direction of the vehicle, for example. Here, the wheel remains flexibly held on the body via the wheel linkage during compression and decompression and thus flexibly coupled on the body. For this, for example, the wheel linkage is, on the one hand, coupled at least indirectly to the chassis. On the other hand, the wheel linkage is at least flexibly coupled to the wheel. In particular, the wheel linkage is, for example, on the other hand coupled flexibly to a wheel support at least indirectly, in particular directly. On the one hand, the wheel linkage can be coupled flexibly to the chassis at least indirectly, in particular directly, or the wheel linkage is, on the one hand, coupled flexibly to a component formed separately to the body and fixed, in particular mounted, on the body, the component being able to be formed, for example, as an integral support or auxiliary frame. During the respective compression or decompression, the wheel linkage pivots, on the one hand, in relation to the body and, on the other hand, in relation to the wheel, in particular while the wheel linkage is or remains flexibly connected at least indirectly to the body and at least indirectly to the wheel.

The wheel linkage has a bearing region by means of which the wheel linkage is to be supported pivotably around a pivot axis in relation to the body at least indirectly on the body of the motor vehicle. In particular, it is provided, for example, that the bearing region defines or forms the pivot axis. This means, in particular, that, in the completely manufactured state of the motor vehicle, the wheel linkage is flexibly connected at least indirectly to the body via its or by means of its bearing region inn such a way that the bearing region forms the pivot axis around which the wheel linkage pivots in relation to the body, in particular with deflection and rebounding movements of the wheel. To do so, the bearing region comprises, for example, at least one bearing element, which can be formed, in particular, as a rubber bearing. Alternatively or additionally, the bearing region can have at least one receiver also referred to as a bearing receiver, in which a bearing element, such as a rubber bearing, for example, can be received or is received, in particular at least extensively or completely. Here, the wheel linkage is to be mounted or is mounted via the bearing element, in particular elastically, at least indirectly on the body. In particular, it is conceivable that the bearing receiver is formed to be at least substantially round on the side of its inner periphery and/or is formed as a bore.

Moreover, the wheel suspension comprises at least one spring element, by means of which the wheel linkage can be or is supported in a spring-loaded manner on the body, in particular in the vertical direction of the vehicle. The spring element is a mechanical spring, for example, which can be formed from a metallic material or from a fibre-reinforced plastic. For example, the spring is a coil spring or a spiral spring. In the event of a compression movement of the wheel, the spring element is tensioned, for example, in particular compressed. In doing so, the spring provides a spring force, by means of which the or a decompression of the wheel can be caused or supported.

In order to now be able to implement a guide of the wheel by means of the wheel suspension in a particular cost-effective, weight-saving and manoeuvrable manner that is also favourable in terms of installation space, it is provided according to the invention that the wheel linkage has a first linkage arm extending in a direction away from the bearing region. In the installation position of the wheel suspension, the first direction, for example, runs or points outwardly in the transverse direction of the vehicle. Here, the wheel suspension assumes its installation position in the completely manufactured state of the motor vehicle, in particular when the motor vehicle is supported downwardly on a horizontal ground in the vertical direction of the vehicle via its wheels. The first linkage arm has, in particular at least, one first connecting element, by means of which the wheel support mentioned above can be or is connected to the first linkage arm and thus to the wheel linkage. The wheel mentioned above, for example in the completely manufactured state of the motor vehicle, is rotatably mounted at least indirectly on the wheel support, such that the wheel can rotate around the wheel axis of rotation, in particular in the event of the journey mentioned above along the ground, in relation to the wheel support and, as a result, in relation to the body. To do so, a wheel hub is mounted rotatably on the wheel support, for example, such that the wheel hub can rotate around the wheel axis of rotation in relation to the wheel support. Here, for example the wheel is non-rotationally connected to the wheel hub, in particular reversibly detachably, such that the wheel hub and the wheel rotate or can rotate together around the wheel axis of rotation in relation to the wheel support.

The connecting element has, for example, a second receiver also referred to as a second mounting receiver, in which a second mounting element can be or is received at least partially, in particular at least extensively or completely. Here, the second mounting element can be formed as a rubber bearing. In particular, the second receiver can be formed to be at least substantially round on the side of its inner periphery and/or as a bore.

Furthermore, the wheel linkage has a second linkage arm extending in a second direction opposite to the first direction from the bearing region and thus extending away from the first linkage arm. For example, the second direction runs or points inwardly in the transverse direction of the vehicle in the installation position of the wheel suspension. The feature that the second direction is opposite the first direction is to be understood, in particular, in that the directions form an angle with each other which is greater than 90°, in particular greater than 120° and quite particularly greater than 150°. In other words, the smallest angle enclosed by the directions is preferably greater than 90°, in particular greater than 120° and preferably greater than 150°. For example, the angle is 180°. Alternatively or additionally, the directions run on the same plane. In particular, the feature that the directions enclose the angle mentioned above with each other is to be understood to mean that the directions enclose the angle in relation to the plane spanned by the transverse direction of the vehicle in the longitudinal direction of the vehicle in the installation position of the wheel suspension. Expressed differently again, it is preferably provided that respective projections of the directions onto or into the plane spanned by the transverse direction of the vehicle and in the longitudinal direction of the vehicle enclose the angle with one another in the installation position of the wheel suspension.

Furthermore, the linkage arm has, in particular, at least one second connecting element, by means of which the spring element is flexibly connected to the second linkage arm and thus to the wheel linkage. The second connecting element has, for example, a third receiver also referred to as a third bearing receiver, in which, for example, at last one third bearing element can be at least partially, in particular at least extensively or completely, received. The spring element, for example, is flexibly connected to the second linkage arm via the third bearing element and is thus coupled to the wheel linkage.

Since the second linkage arm extends in the second direction from the bearing regions and thus away from the first linkage arm, the wheel linkage has a longitudinal extension direction, for example. In relation to the longitudinal extension direction, the bearing region is arranged between the linkage arms. In other words, for example in relation to the respective direction, the bearing region is arranged in such a way that, in relation to the respective direction, the first linkage arm is arranged on this side and the second linkage arm on the other side of the bearing region. Thus, the wheel linkage is formed in the manner of a seesaw or in the shape of a seesaw. Expressed differently again, the first connecting element, for example, is arranged on a first side of the bearing region, and the second connecting element is arranged on a second side of the bearing region facing away from the first side. Here, it is conceivable that the first connecting element is arranged on a first end of the first linkage arm. Alternatively or additionally, the second connecting element is arranged on a second end of the second linkage arm, wherein the ends are respective ends of the wheel linkage itself. As a result of this arrangement and design of the wheel linkage, the spring element can be shifted inwardly in the transverse direction of the vehicle in comparison to conventional wheel suspensions, such that a particularly cost-effective, weight-saving and manoeuvrable manner that is also favourable in terms of installation space and a solution with a very flat design for guiding the wheel can be implemented. In particular, the wheel suspension can be used identically or structurally identically for a front axle and for a rear axle of the motor vehicle. Moreover, it is possible to create a preferably purely electrically driven, in particular an all-wheel driven and preferably self-driving vehicle platform. In other words, it is preferably provided that the motor vehicle is a self-driving motor vehicle. Alternatively or additionally, the motor vehicle can have a four-wheel drive or an all-wheel drive, such that, for example, at least or exactly four wheels or all wheels of the motor vehicle, in particular the computing unit, can be driven electrically. Furthermore, it is conceivable that the motor vehicle is formed as a hybrid vehicle or as an electric vehicle, in particular as a battery-operate electric vehicle. If the wheel suspension is used for the front axle, for example then the first direction, for example, points outwardly in the transverse direction of the vehicle, and the second direction points inwardly. If the wheel suspension is used for the rear axle, for example, then the wheel linkage, for example, is used rotated by 180° around the vertical direction of the vehicle, such that then the first direction, for example, points inwardly in the transverse direction of the vehicle and the second direction points outwardly in the transverse direction of the vehicle.

The second linkage arm has a first longitudinal region having the second connecting element and a second longitudinal region attached to the first longitudinal region and arranged between the bearing region and the first longitudinal region, which longitudinal region is offset or set back in relation to the bearing region and in relation to the first longitudinal region downwardly in the vertical direction of the vehicle in the installation position of the wheel suspension. In doing so, the wheel linkage can be arranged in a manner that is particularly favourable in terms of construction space. In particular, it is possible to arrange the wheel linkage particularly close to a component of the vehicle adjacent to the wheel linkage in the completely manufactured state of the motor vehicle in such a way that the connecting element, for example, or the linkage arms are arranged particularly close to the component. The component is, for example, a support, in particular a longitudinal support, of the body. For example, the bearing region and a transition region arranged between the second longitudinal region and the first longitudinal region border a receiver of the wheel linkage in the transverse direction of the vehicle, wherein the receiver is bordered by the second longitudinal region in the vertical direction of the vehicle, in particular downwardly. Here, the component mentioned above, in particular the support, can be arranged at least partially in the receiver. In other words, it is conceivable that the support also formed, in particular, as a load support, extends through the receiver. In doing so, the wheel linkage attached flexibly, for example, to the support can be arranged in relation to the support in a manner that is particularly favourable in terms of construction space.

In particular, it is conceivable that the spring element is a component of the spring device, which also comprises a pressure stop, for example, for the spring element. The pressure stop limits a compression of the spring element, for example.

A further embodiment is characterised in that the first linkage arm and/or the second linkage arm runs obliquely in relation to the transverse direction of the vehicle in the installation position of the wheel suspension.

In order to be able to present a particularly advantageous wheel suspension in a particularly cost-effective manner that is also favourable in terms of installation space, it is provided in a further design of the invention that the first linkage arm springs from the bearing region in a first root region and the second linkage arm from the bearing region in a second root region, wherein the root regions are arranged one after the other or one behind the other in the longitudinal direction of the vehicle in the installation position of the wheel suspension and are thus offset in relation to one another.

Here, it has been shown to be particularly advantageous when the root regions are arranged at the same height in the vertical direction of the vehicle in the installation position of the wheel suspension. In doing so, particularly advantageous linking behaviour can be implemented. Moreover, a particular flat construction of the wheel linkage can be presented.

In a further design of the invention, the wheel suspension comprises a second wheel linkage provided in addition to the wheel linkage, formed separately to the wheel linkage and provided or formed to guide the wheel, the second wheel linkage being arranged below the first wheel linkage in the vertical direction of the vehicle in the installation position of the wheel suspension. Here, the designs above and below relating to the first wheel linkage, in particular in relation to its flexible connection to the wheel and the body, can also be readily transferred to the second wheel linkage and vice versa. By using the second wheel linkage, a particularly defined and thus advantageous guide of the wheel can be implemented.

In order to here implement an advantageous guide of the wheel in a manner particularly favourable in terms of construction space, it is provided in a further design of the invention that the second wheel linkage is formed as a triangular linkage.

A second aspect of the invention relates to a motor vehicle preferably formed as a passenger vehicle, which has a body preferably formed as a self-supporting chassis, at least one wheel and at least one wheel suspension, in particular according to the first aspect. Here, the at least one wheel is flexibly coupled to the body via the wheel suspension and is thus flexibly held on the body.

The wheel suspension has at least one wheel linkage provided or formed for guiding the wheel, the wheel linkage having a bearing region by means of which the wheel linkage is pivotably mounted around a pivot axis in relation to the body at least indirectly on the body. Moreover, the wheel suspension comprises at least one spring element, by means of which the wheel linkage is supported in a sprung manner on the body. The wheel suspension moreover comprises a wheel support, on which the wheel is rotatably mounted.

In order to now be able to implement a particularly advantageous guide of the wheel in a particularly cost-effective, weight-saving and manoeuvrable manner that is also favourable in terms of construction space, it is provided in the second aspect of the invention that the wheel linkage has a first linkage arm extending away from the bearing region in a first direction, the linkage arm having a first connecting element, by means of which the wheel support is flexibly connected to the first linkage arm. Moreover, the wheel linkage has a second linkage arm extending away from the bearing region in a second direction opposite to the first direction, the second linkage arm having a second connecting element, by means of which the spring element is flexibly connected to the second linkage arm. Advantages and advantageous designs of the first aspect of the invention are to be seen as advantages and advantageous designs of the second aspect of the invention and vice versa.

In order to be able to keep the construction space requirements as minimal as possible, the second linkage arm has a first longitudinal region having the second connecting element and a second longitudinal region attached to the first longitudinal region and arranged between the bearing region and the first longitudinal region, the second longitudinal region being set back or offset in relation to the bearing region and the first longitudinal region downwardly in the vertical direction of the vehicle.

In order to here be able to implement an arrangement of wheel linkage that is particularly favourable in terms of construction space, in particular in relation to the body, it is provided in a further design of the invention that a transition region of the wheel linkage arranged between the second longitudinal region and the first longitudinal region, via which transition region the second longitudinal region is connected to the first longitudinal region, and the bearing region border a receiver of the wheel linkage in the transverse direction of the vehicle. Here, the receiver is bordered by the second longitudinal region in the vertical direction of the vehicle, in particular downwardly. Furthermore, a longitudinal support is arranged at least partially, in particular at least extensively or completely, in the receiver in particular in relation to its extension running in the vertical direction of the vehicle. The second linkage arm is thus at least substantially trough-shaped, such that the longitudinal support can extend through the receiver in a manner favourable in terms of construction space.

In principle, the wheel suspension according to the invention is based on the so-called double wishbone principle, wherein the wheel linkage is not formed, for example, as a triangular linkage but as an at least substantially seesawed wheel linkage. Here, the wheel linkage preferably functions as a transverse linkage, by means of which the wheel is to be guided or is guided at least or exclusively in the transverse direction of the vehicle in relation to the body. Due to the design of the wheel linkage, the spring element, also referred to as a bearing spring and formed as a bearing spring, as well as its pressure stop, for example, can be relocated further inwardly in the transverse direction of the vehicle and thus into a central axle region, i.e., into a central region of an axle having the wheel suspension, in comparison to conventional solutions. For example, the first linkage arm is arranged further inward in the transverse direction of the vehicle than the second linkage arm, such that the first linkage arm, for example, is also referred to as an inner lever and the second linkage arm as an outer lever. In the transverse direction of the vehicle, for example, the inner lever is arranged clearly in front of a side shaft and in front of a drive motor, by means of which the wheel flexibly attached to the body via the wheel suspension can be driven via the side shaft. In particular when the wheel linkage has the described receiver, the wheel suspension is wound through below the longitudinal support, for example, also referred to as the frame longitudinal support, and in particular outwardly in the transverse direction of the vehicle. The outer lever is, for example, above in a root region in the vertical direction of the vehicle, on its end clearly behind the side shaft in the longitudinal direction of the vehicle and supports a rotational rod frame bearing, via which or by means of which at least or exactly one rotational rod, can be connected or is connected, in particular flexibly, to the wheel linkage. Since one of the levers is arranged on the other side of the bearing region and the other lever on this side of the bearing region, the wheel linkage is a transverse linkage seesaw, which seesaws back and forth when it pivots around the pivot axis in relation to the body and thus in relation to the support. The bearing region is a seesaw axis region, since the bearing region forms the pivot axis. The two levers of the transverse linkage seesaw rise up from the seesaw axis region, for example, in particular due to the side shaft, with clear longitudinal offset. A preferably provided second support of the levers in relation to each other, in particular in parallel to the pivot axis, also referred to as the seesaw axis, can keep a torsional load of the seesaw axis between the longitudinally offset root regions, also referred to as roots, of the levers minimal.

Further advantages, features and details of the invention emerge from the following description of a preferred exemplary embodiment and by means of the drawings. The features and feature combinations mentioned above in the description and the features and feature combinations mentioned below in the description of the figures and/or shown only in the figures can be used not only in the respectively specified combination, but also in other combinations or on their own without leaving the scope of the invention.

DETAILED DESCRIPTION OF THE DRAWINGS

Figure 1:
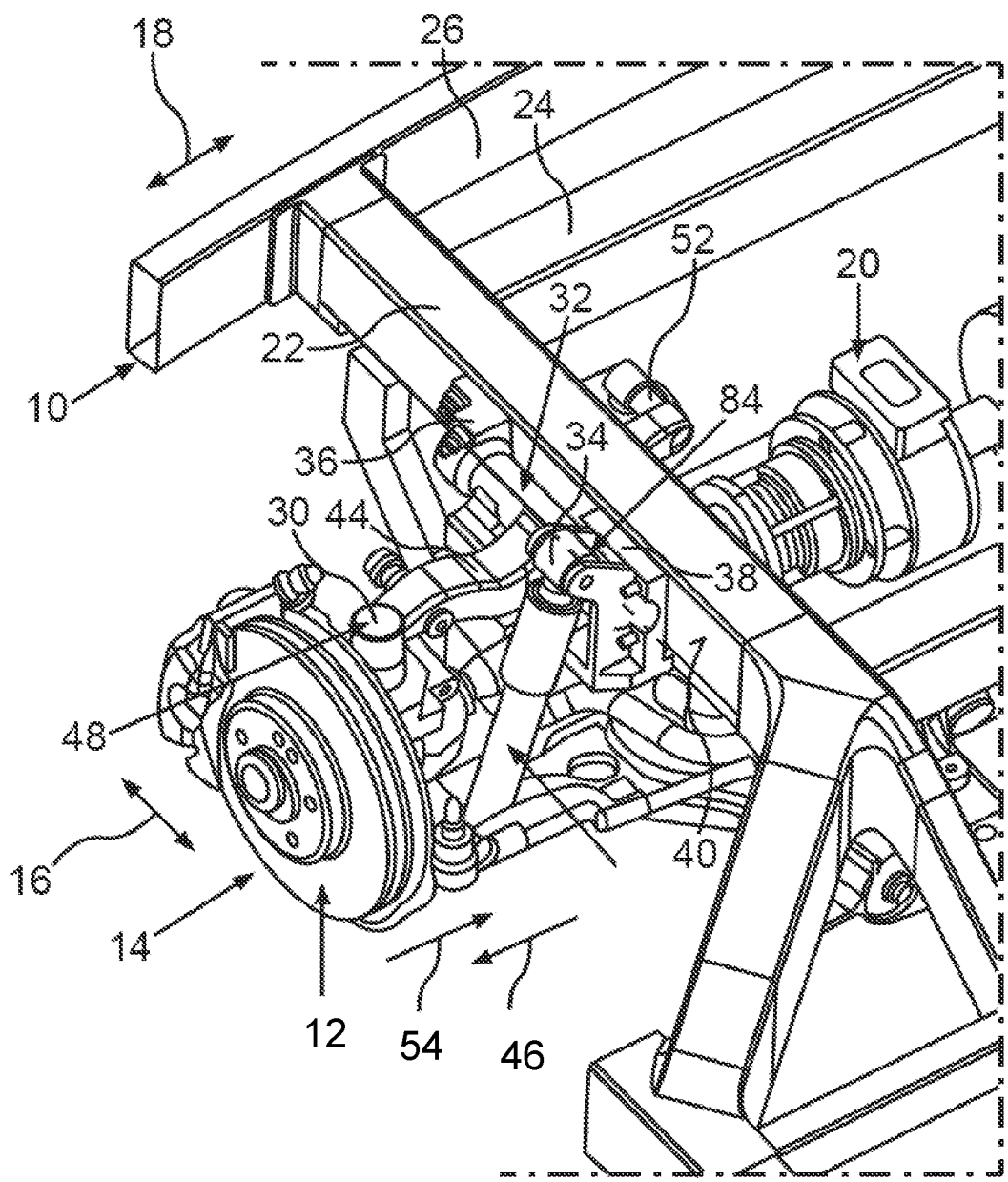
FIG. 1, in sections, is a schematic and perspective top view of a chassis in a wheel suspension, flexibly attached thereon, of a motor vehicle preferably formed as a passenger vehicle.

The same or functionally identical elements are provided with the same reference numerals in the figures.

FIG. 1 shows, in sections, in a schematic and perspective top view, a chassis 10 and a wheel suspension 12 flexibly attached to the chassis 10 and a motor vehicle preferably formed as a passenger vehicle. This means that, in its completely manufactured state, the motor vehicle has the chassis 10 and the wheel suspension 12. The chassis 10 is, for example, a self-supporting body of the motor vehicle. However, in the exemplary embodiment shown in the figures, the chassis 10 is a frame which, in the completely manufactured state of the motor vehicle, is connected, for example, to a structure of the motor vehicle formed separately to the frame and delimiting an interior chamber for occupants of the motor vehicle. An axle 14 can also be seen in sections in FIG. 1; in its completely manufactured state, the motor vehicle has at least or exactly two axles which are arranged one behind the other and thus one after the other in the longitudinal direction of the vehicle.

In FIG. 1, the longitudinal direction of the vehicle is illustrated by a double arrow 16. One of the axles is a front axle, such that the other axis is a rear axle, which is arranged behind the front axle in the longitudinal direction of the vehicle. Presently, the axle 14 is the front axle. The motor vehicle is, for example, an electric vehicle, in particular a battery-powered electric vehicle, such that the motor vehicle can preferably be driven purely electrically. The designs above and below relating to the axle 14 can also readily be transferred to the rear axle and vice versa unless otherwise specified.

The axle 14 has at least or exactly two wheels not depicted in the figures and spaced apart from each other in the transverse direction of the vehicle, the wheels also being referred to as vehicle wheels. In FIG. 1, the transverse direction of the vehicle is illustrated by a double arrow 18 and runs perpendicularly to the longitudinal direction of the vehicle. The wheels are ground contact elements, via which the motor vehicle is supported downwardly in the vertical direction of the vehicle on an in particular horizontal ground. The axle 14 here has at least one drive motor 20, by means of which, for example, at least or exactly one of the wheels of the axle 14 can be driven, in particular purely electrically. Thus, the drive motor 20 is formed, for example, as an electric machine, in particular as an electric engine. The chassis 10 has at least two longitudinal bearings spaced apart from each other in the transverse direction of the vehicle and extending at least substantially in the longitudinal direction of the vehicle, of which longitudinal bearings a longitudinal bearing labelled with 22 in FIG. 1 can be seen. Moreover, the chassis 10 has at least one crossmember 24, via which the longitudinal bearings are connected to one another. Moreover, in FIG. 1, a further longitudinal element in the form of a flexible crossmember 26 can be seen, which is attached to the longitudinal bearings.

The axle 14 is a driven or drivable axle. This means that the wheels of the axle 14 are drivable or driven wheels. Here, it can be seen particularly easily when looking at FIGS. 2 to 4 together that the wheel suspension 12 has a wheel carrier 28 on which the wheel that can be driven by means of the drive motor 20 is at least indirectly rotatably mounted. The wheel of the axle 14 that can be driven by means of the drive motor 20 is also referred to below simply as wheel or vehicle wheel, wherein the designs above and below relating to the wheel can also be readily transferred to the other wheels or to the other wheel of the axle 14 and vice versa.

The wheel suspension 12 has a first wheel linkage 30 formed as a first cross linkage, by means of which the wheel is to be guided or is guided in relation to the chassis 10 and thus in relation to the body. This means that the wheel linkage 30 is provided and formed for guiding the wheel. The wheel linkage 30 has a bearing region 32, by means of which the wheel linkage 30 is mounted on the longitudinal bearing 22 and thus at least indirectly on the body of the motor vehicle pivotably around a pivot axis 34 in relation to the longitudinal bearing 22 and thus in relation to the body. To do so, two bearing blocks 36 and 38 spaced apart from each other in the longitudinal direction of the vehicle are provided. The bearing blocks 36 and 38 are formed separately from each other, for example, and/or are held on a side 41 of the longitudinal bearing 22 pointing outwardly in the transverse direction of the vehicle. Here, the wheel linkage 30 is mounted via the bearing blocks 36 and 38 on the longitudinal bearing 22 pivotably around the pivot axis 34 in relation to the longitudinal bearing 22. To do so, the bearing region 32 has, for example, at least one first bearing receiver 38, in which, for example in particular for each bearing block 36 or 38, a first bearing element is at least partially, in particular at least extensively or completely, received. The first bearing element is, for example, a rubber bearing, via which the wheel linkage 30 is mounted elastically, in particular rubber-elastically, on the longitudinal bearing 22, in particular in the radial direction of the respective bearing element. For example, the bearing elements are formed separately from one another and, in particular in the longitudinal direction of the vehicle, are spaced apart from one another. One of the bearing elements can be seen in FIG. 2, for example, and is labelled there with 40.

Figure 2:
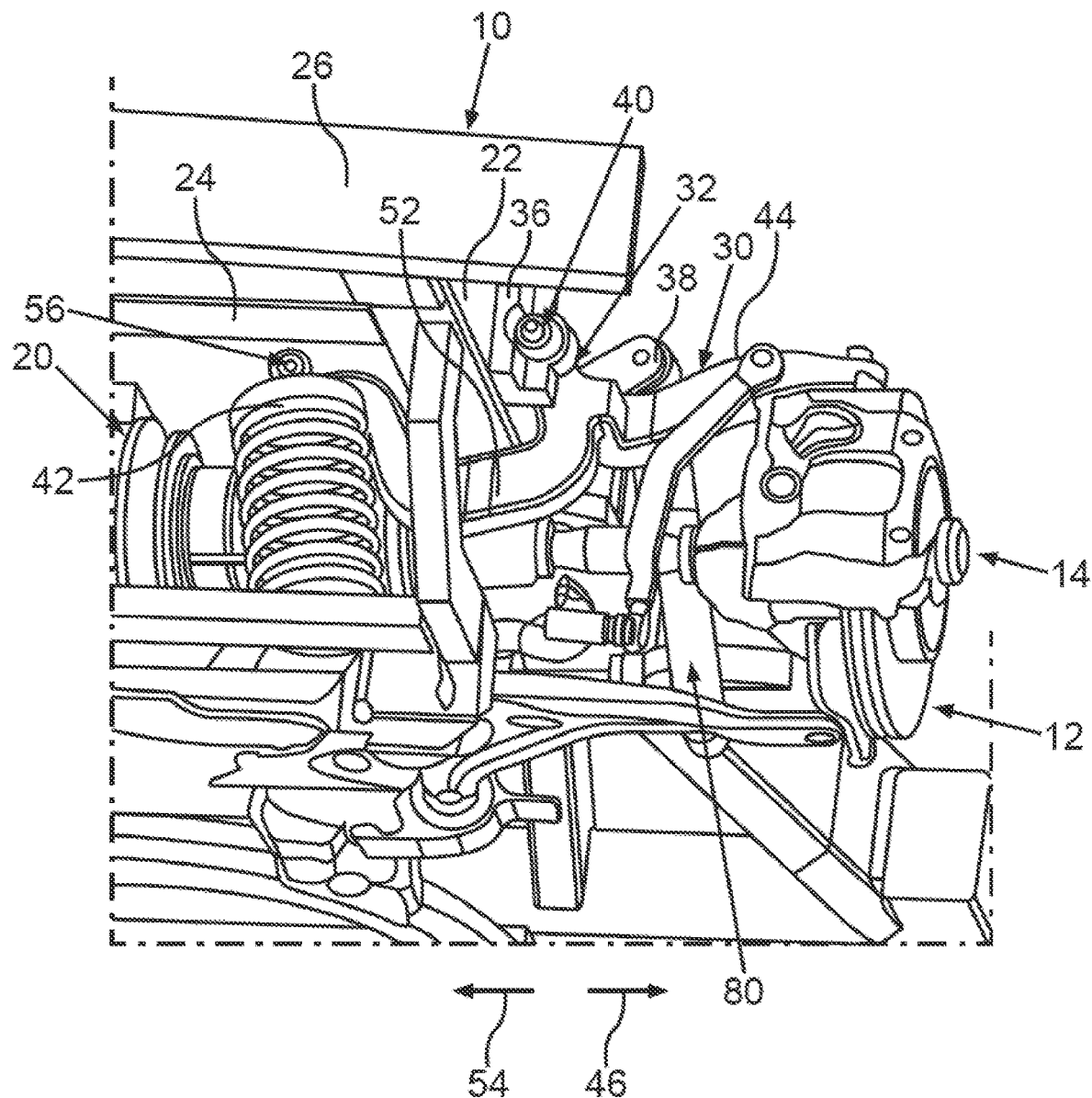
FIG. 2, in sections, is a schematic and perspective front view of the chassis and the wheel suspension.

It can be seen particularly well in FIG. 2 that the wheel suspension 12 has a spring element 42, which is formed as a mechanical spring, in particular as a mechanical coil spring, in the exemplary embodiment shown in the figures. The wheel linkage 30 is supported in a sprung manner on the chassis 10 and thus on the body by means of the spring element 42, or via the spring element 42.

In order to now implement a particularly advantageous guide of the wheel in a particularly cost-effective manner that is favourable in terms of weight, mobility and installation space, the wheel linkage 30—as can be seen, in particular, when looking at FIGS. 9 to 13 together—has a first linkage arm 44 extending away from the bearing region 32 in a first direction, wherein the first direction is illustrated in FIG. 1 by an arrow 46. In the exemplary embodiment shown in the figures, the first direction points outwardly in the transverse direction of the vehicle.

The first linkage arm 44 has a first connecting element 48, by means of which the wheel support 28 is flexibly connected to the first linkage arm 44 and thus to the wheel linkage 30. To do so, the first connecting element 48 has, for example, a first bearing receiver 50 (FIG. 3), in which a connecting part is arranged, for example. The wheel bearing 28 is flexibly connected to the wheel linkage 30 by means of the connecting part. The connecting part is also referred to as the first connecting part and, for example, is formed separately from the wheel linkage 30 and/or separately from the wheel support 28 and is thus partially received, in particular at least extensively or completely, in the bearing receiver 50.

Moreover, the wheel linkage 30 has a second linkage arm 52 extending in a second direction opposite the first direction away from the bearing region 32 (FIG. 2). Here, in FIG. 1 for example, the second direction is illustrated by an arrow 54 and, in the exemplary embodiment illustrated in the figures, the second direction runs or points inwardly in the transverse direction of the vehicle. As can be seen particularly easily in FIG. 4, the second linkage arm 52 has a second connecting element 56, by means of which the spring element 42 is connected flexibly to the second linkage arm 53 and thus flexibly to the wheel linkage 30, in particular by using a spring seat.

Figure 4:
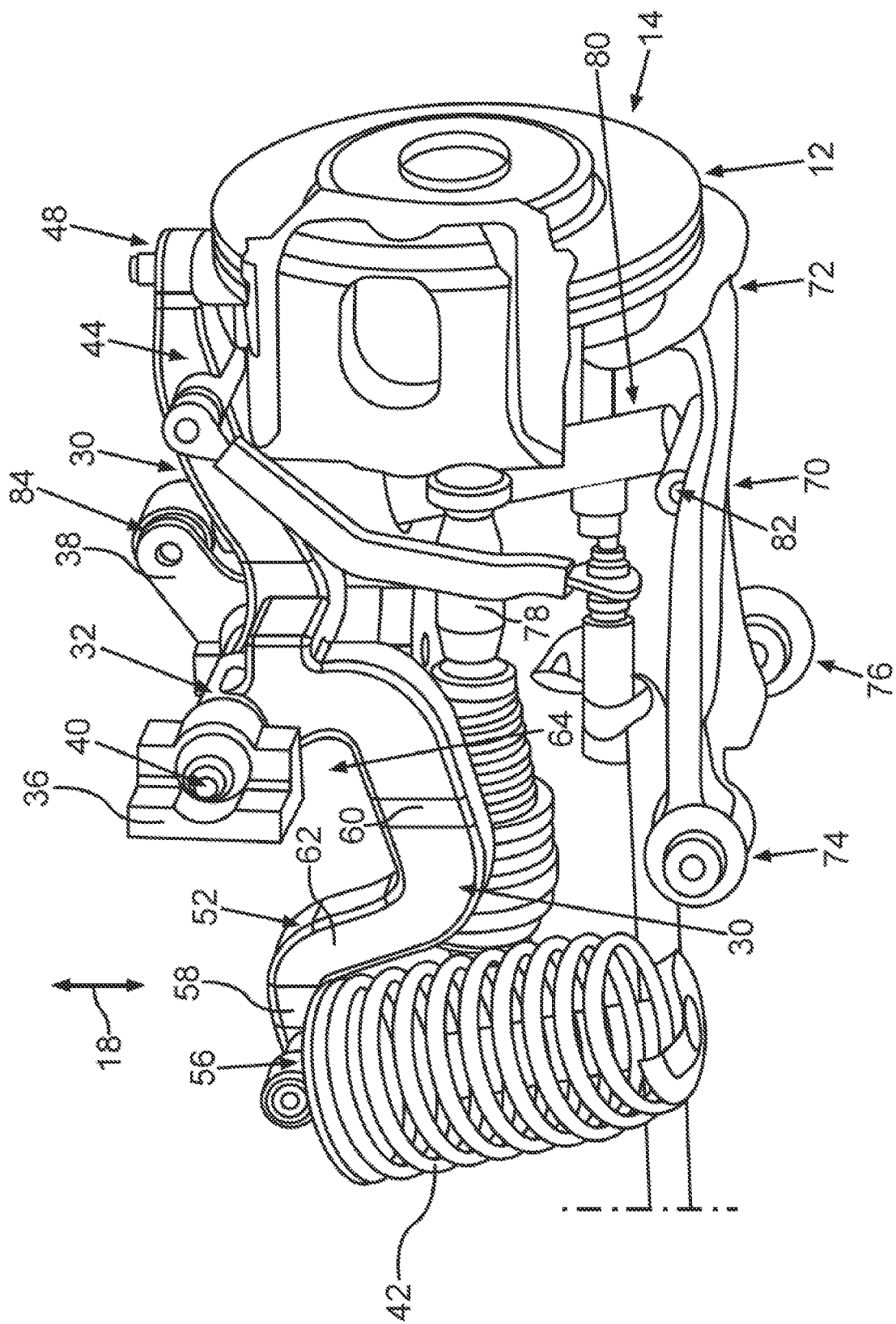
FIG. 4 is a schematic perspective view of the wheel suspension.
Figure 5:
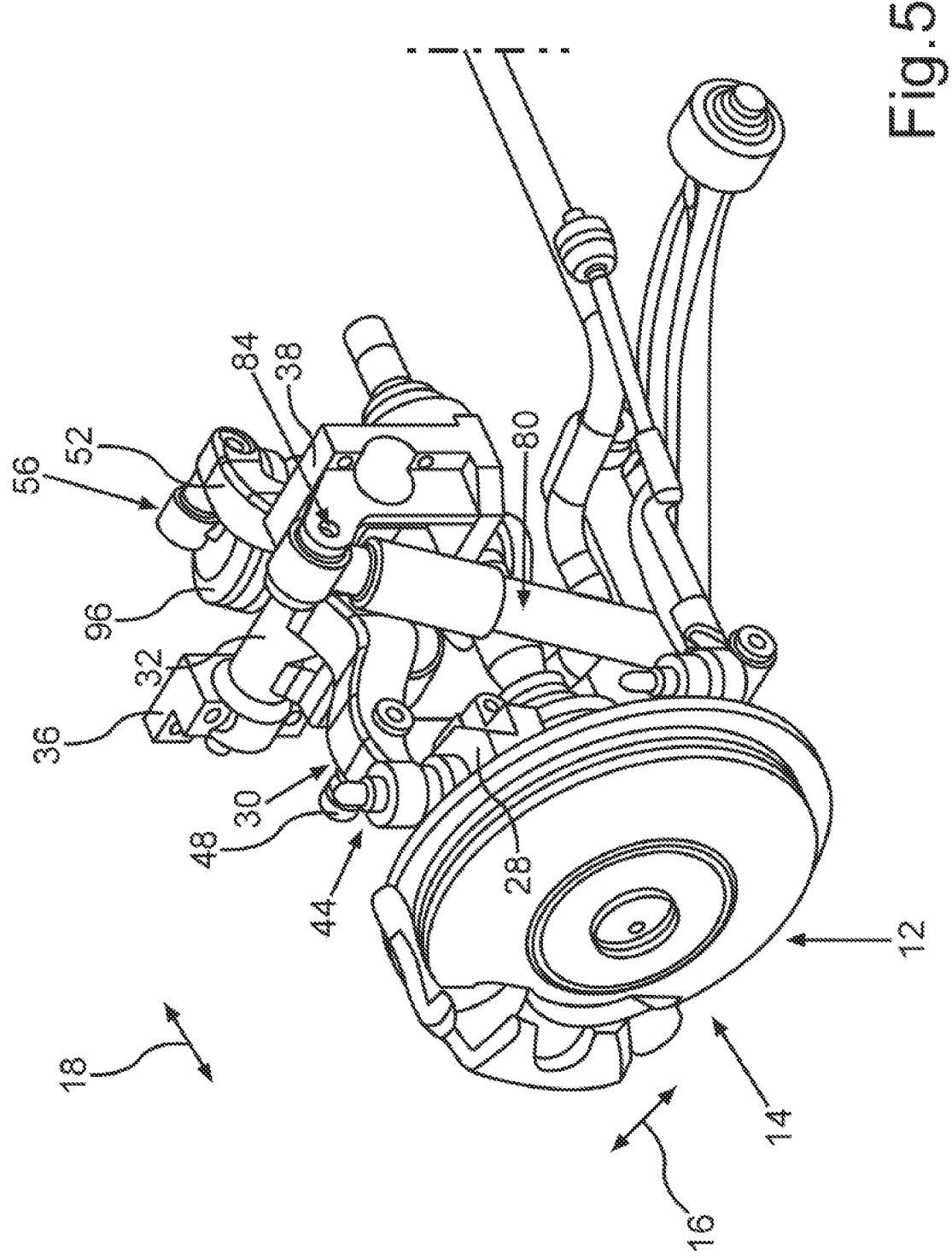
FIG. 5 is a further schematic perspective view of the wheel suspension.

It can be seen particularly well in FIG. 4 that the first linkage arm 52 has a first longitudinal region 58 having the second connecting element 56 and a second longitudinal region 60 attached to the first longitudinal region 58 and arranged between the bearing region 32 and the first longitudinal region 58, the second longitudinal region presently being offset downwards in relation to the bearing region 32 and in relation to the longitudinal region 58 in the installation position of the wheel suspension 12 in the vertical direction of the vehicle, i.e., back-offset. Here, the installation position of the wheel suspension 12 is shown in the figures. A transition region 62 of the wheel linkage 30, the longitudinal region 60 being connected to the longitudinal region 58 via its transition region 62, delimits an at least substantially U-shaped receiver 64 of the wheel linkage 30 in the transverse direction of the vehicle presently inwardly. The receiver 64 is delimited outwardly in the transverse direction of the vehicle by the bearing region 32. The receiver 64 is delimited downwardly in the vertical direction of the vehicle by the longitudinal region 60. The longitudinal regions 58 and 60 are here formed to be integral with each other. Alternatively or additionally, the longitudinal region 58 and/or 60 is connected to the transition region 62 and/or to the bearing region 32. For example, the bearing region 32 is integrally connected to the linkage arm 44 and/or 52.

When looking at FIGS. 1 and 2 together, it can be seen particularly well that the longitudinal bearing 22 extends through the receiver 64 in the longitudinal direction of the vehicle, such that the longitudinal bearing 22 is arranged at least partially, in particular at least extensively or completely, in the receiver 64 in terms of its extensions running in the vertical direction of the vehicle. Thus, the longitudinal bearing 22 is covered by the transition region 62 and/or the longitudinal region 58, for example inwardly in the transverse direction of the vehicle, and the longitudinal bearing 22 is covered at least partially by the bearing region 32 outwardly in the transverse direction of the vehicle.

Figure 3:
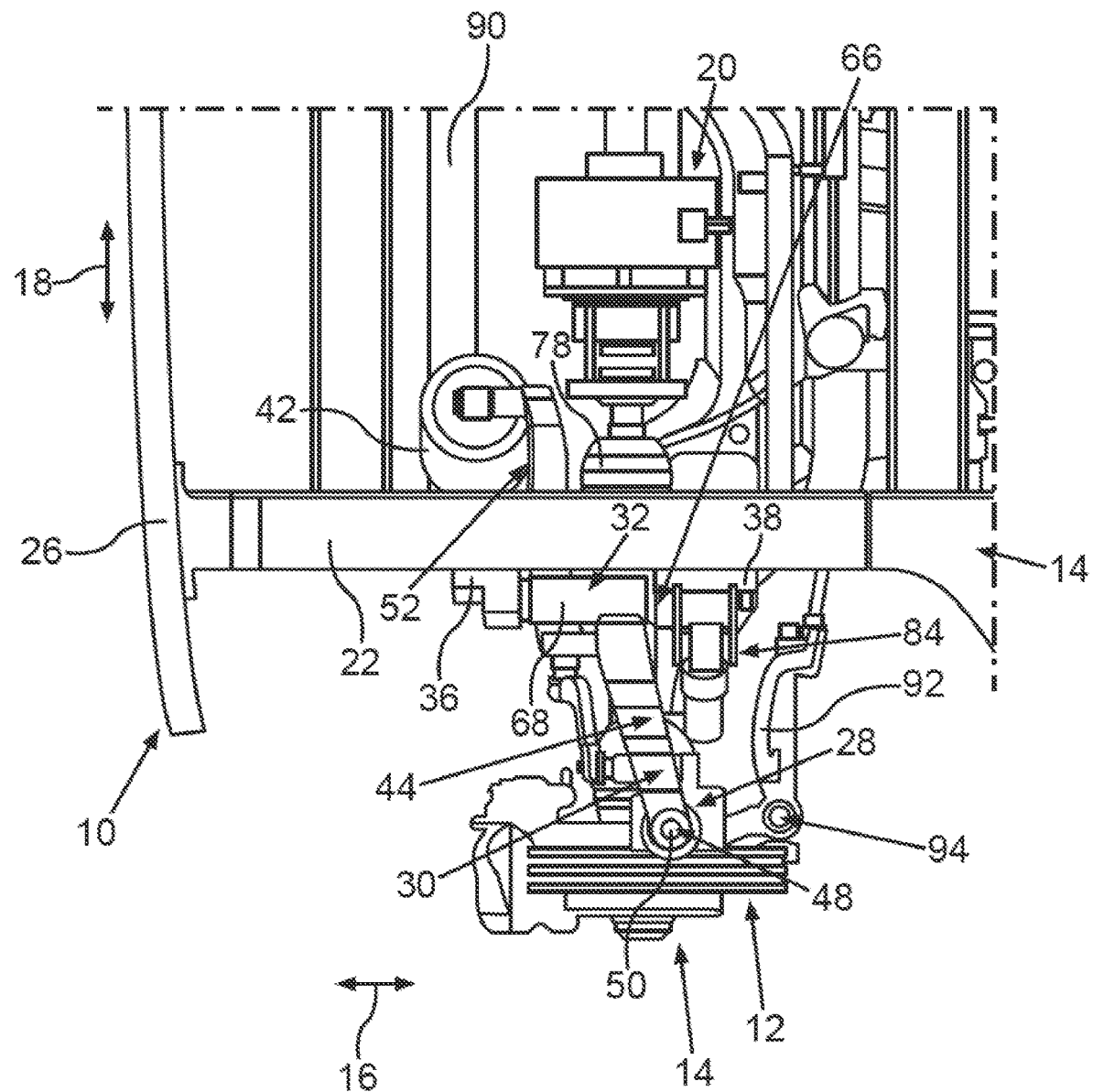
FIG. 3, in sections, is a schematic top view of the chassis and the wheel suspension.

It can be seen particularly well from FIG. 3 that the first linkage arm 44 emerges from the bearing region 32 in a first root region 66 and the second linkage arm 52 from the bearing region 32 in a second root region, wherein the root regions 66 and 68 are arranged one after the other and thus one behind the other in the longitudinal direction of the vehicle (double arrow 16). Moreover, the root regions 66 and 58 are arranged at the same height in the vertical direction of the vehicle. In the exemplary embodiment illustrated in the figures, the wheel suspension 12 has a second wheel linkage 70 provided in addition to the wheel linkage 30 formed as a transverse linkage, formed separately from the wheel linkage 30 and provided or formed for guiding the wheel, the second wheel linkage being arranged below the wheel linkage 30 in the vertical direction of the vehicle, i.e., at a lower height than the wheel linkage 30. Here, the wheel linkage 70 is formed as a triangle linkage. The wheel linkage 70 has exactly one first coupling point 72, at which the wheel linkage 70 is flexibly coupled to the wheel bearing 28. The coupling point 72 is provided on a first end of the wheel linkage 70. On a second end of the wheel linkage 70, this has exactly two coupling points 74 and 76 spaced apart from each other in the longitudinal direction of the vehicle, the coupling points also being spaced apart from the coupling point 72. At the coupling points 74 and 76, the wheel linkage 70 is at least indirectly coupled flexibly to the body or to the chassis 10. Furthermore, a lateral shaft 78 is provided, via which the wheel can be driven by the drive motor 20, in particular purely electrically.

In order to attenuate the deflection or rebounding movements of the wheel bearing 28 taking place in relation to the body and in relation to the chassis 10, the wheel suspension 12 has an in particular hydraulic shock absorber 80. The shock absorber 80 is coupled, for example, to the wheel linkage 70, in particular flexibly. To do so, the wheel linkage 70 has a fourth coupling point 82 spaced apart from the coupling points 72, 74 and 76, at which fourth coupling point the shock absorber 80 is flexibly connected to the wheel linkage 70, in particular on one end. The shock absorber 80 is flexibly coupled at least indirectly or the chassis 10 or to the body on the other end. To do so, the bearing block 38 has a bearing point also referred to as the upper damper bearing, at which the shock absorber 80 also referred to simply as damper is flexibly coupled to the bearing block 38. Thus, the shock absorber 80 is flexibly coupled to the frame and thus to the body by using the bearing block 38. It can be seen that the upper damper bearing (bearing point 84) is integrated into the bearing block 38 also referred to as the linkage block. Based on the bearing blocks 36 and 38 also referred to as bearing blocks, the bearing block 38 is also a rear bearing block, since the bearing block 38 is arranged behind the bearing block 36 in the longitudinal direction of the vehicle.

Figure 6:
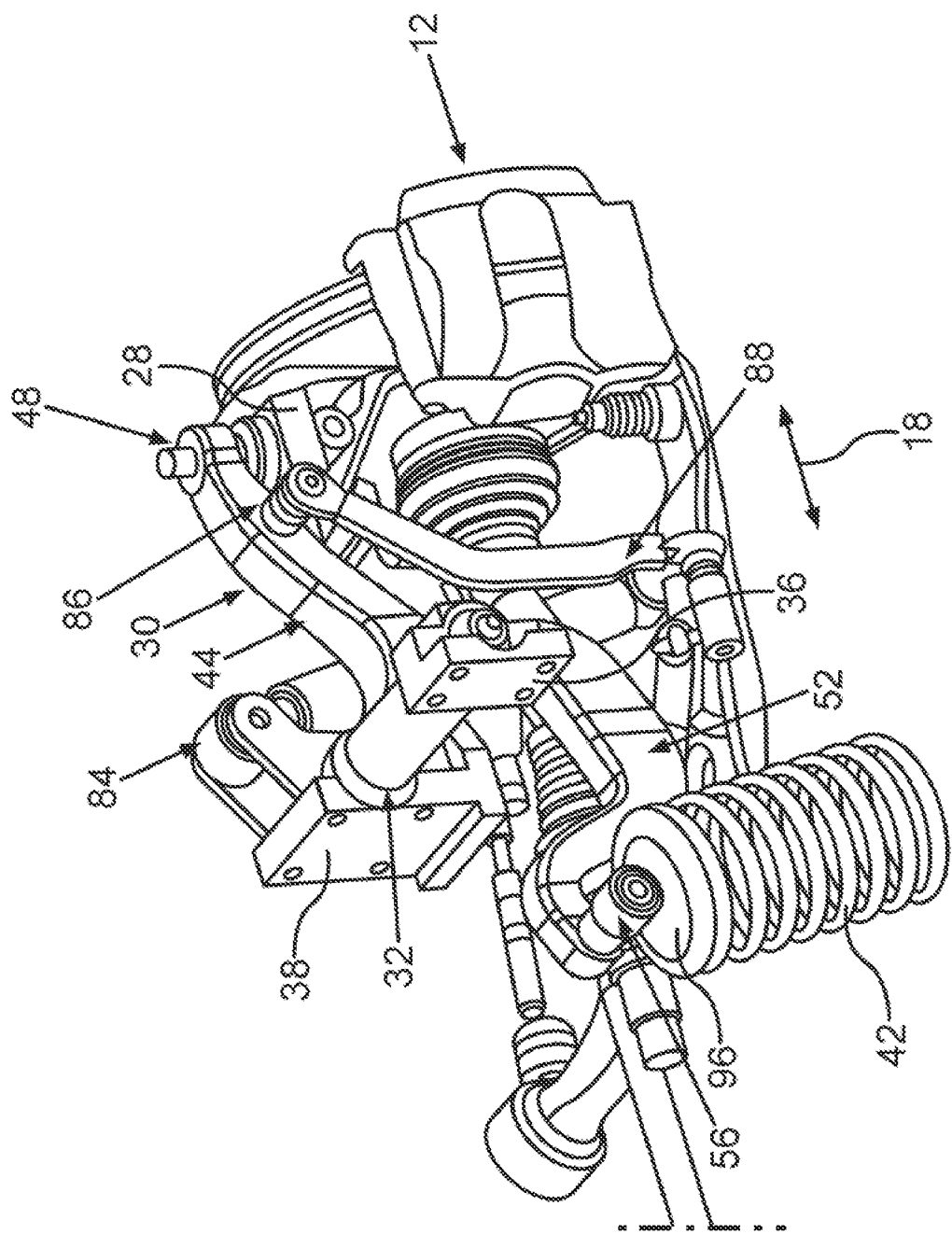
FIG. 6 is a further schematic perspective view of the wheel suspension.

Furthermore, a pressure stop is preferably allocated to the spring element 42, by means of which pressure stop a compression of the spring element 42 can be delimited. Such a compression of the spring element 42 is the result, for example, of a deflection movement of the wheel, which moves in the vertical direction of the vehicle, in particular upwardly, in relation to the chassis 10 and thus in relation to the body as part of the deflection movement. It can be seen particularly easily from FIG. 6 that the wheel linkage 30 formed as a transverse linkage has a further coupling point 86, which is spaced apart from the connecting element 48 and 56 and thus from points at which the connecting elements 48 and 56 are arranged and from the bearing region 32. For example, the first linkage arm 44 has the coupling point 86. At the coupling point 86, a rotary rod assembly 88 of the wheel suspension 12, also referred to as a torsion rod assembly, is coupled to the linkage arm 44 and thus to the wheel linkage 30, in particular flexibly.

In order to be able to support the spring element 42, for example, on sides of the body or on sides of the frame, such that, with a deflection movement of the wheel, the result is a tension, in particular a compression, of the spring element 42, the frame has a transverse element 90 allocated in the spring element 42 and also referred to as a spring frame crossmember (FIG. 3). Here, the spring element 42 can be supported or is supported, in particular in the vertical direction of the vehicle and preferably from below, at least indirectly, in particular directly, on the transverse element 90.

Furthermore, a gauge bar 92 of a link transmission can be seen in FIG. 3. The axle 14 is a linkable or linked axle, such that the wheels of the axle 14 are linkable or linked wheels. This means that the wheels of the axle 14 can be deflected by means of the link transmission, i.e., pivoted around a respective pivot axis in relation to the body and thus in relation to the chassis 10. By deflecting the wheels of the axle 14, lane changes, direction changes and cornering of the motor vehicle can be caused. Here, the gauge bar 92 is coupled at a link connecting point 94 at least indirectly, in particular directly, and preferably flexibly to the wheel support 28. Here, a so-called rear deflection is created, since the link connecting point 94 is arranged behind the center of the wheel, also referred to as the wheel center, i.e., behind the rotational axis of the wheel, in the longitudinal direction of the vehicle. Here, the wheel center is on the rotational axis of the wheel. As a result of the arrangement of the link behind the wheel center, a particularly compact construction can be depicted. Overall, it can be seen that the wheel link 30 is formed at least substantially in the manner or a seesaw or in the shape of a seesaw. Here, the bearing region 32 extends on a plane which runs or is arranged overall between the link arms 44 and 54, in particular in the longitudinal extension direction of the link arms 44 and 52 and thus in the longitudinal extension direction of the wheel link 30.

It can be seen from FIG. 6 that the spring element 42, in particular in the vertical direction of the vehicle and here preferably upwardly, can be supported or is supported via the spring plate mentioned above and labelled with 96 in FIG. 6 on the link arm 52. In particular, a pivot bearing or pivot joint is formed by the second connecting element 56, with which the spring plate 96 and, via this, the spring element 42, is pivotably coupled to the link arm 52. This means that the upper spring plate 96 and the pivot joint are provided on the link arm 52, also referred to as the seesaw arm, or are attached to this.

Figure 7:
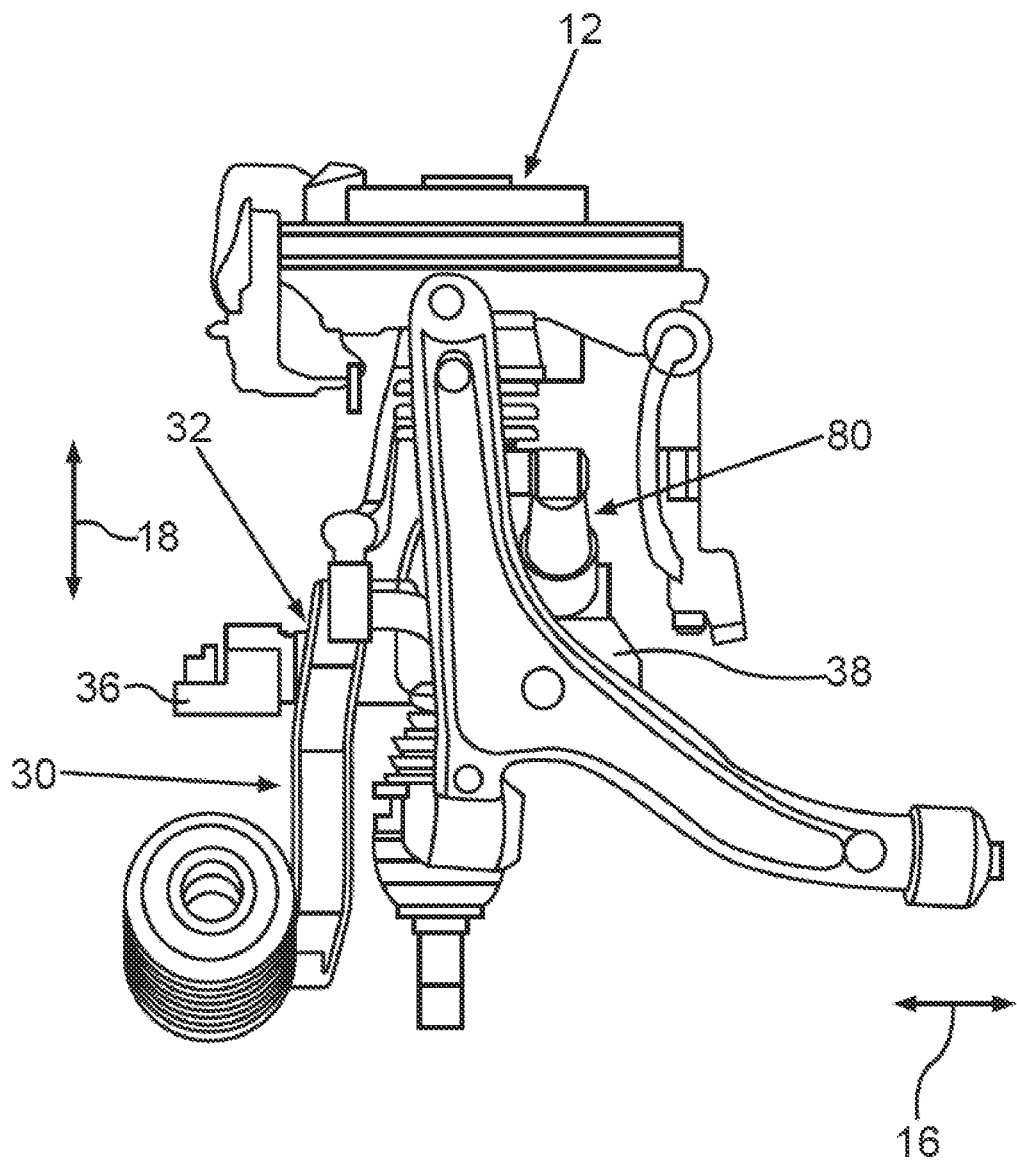
FIG. 7 is a schematic bottom view of the wheel suspension.
Figure 8:
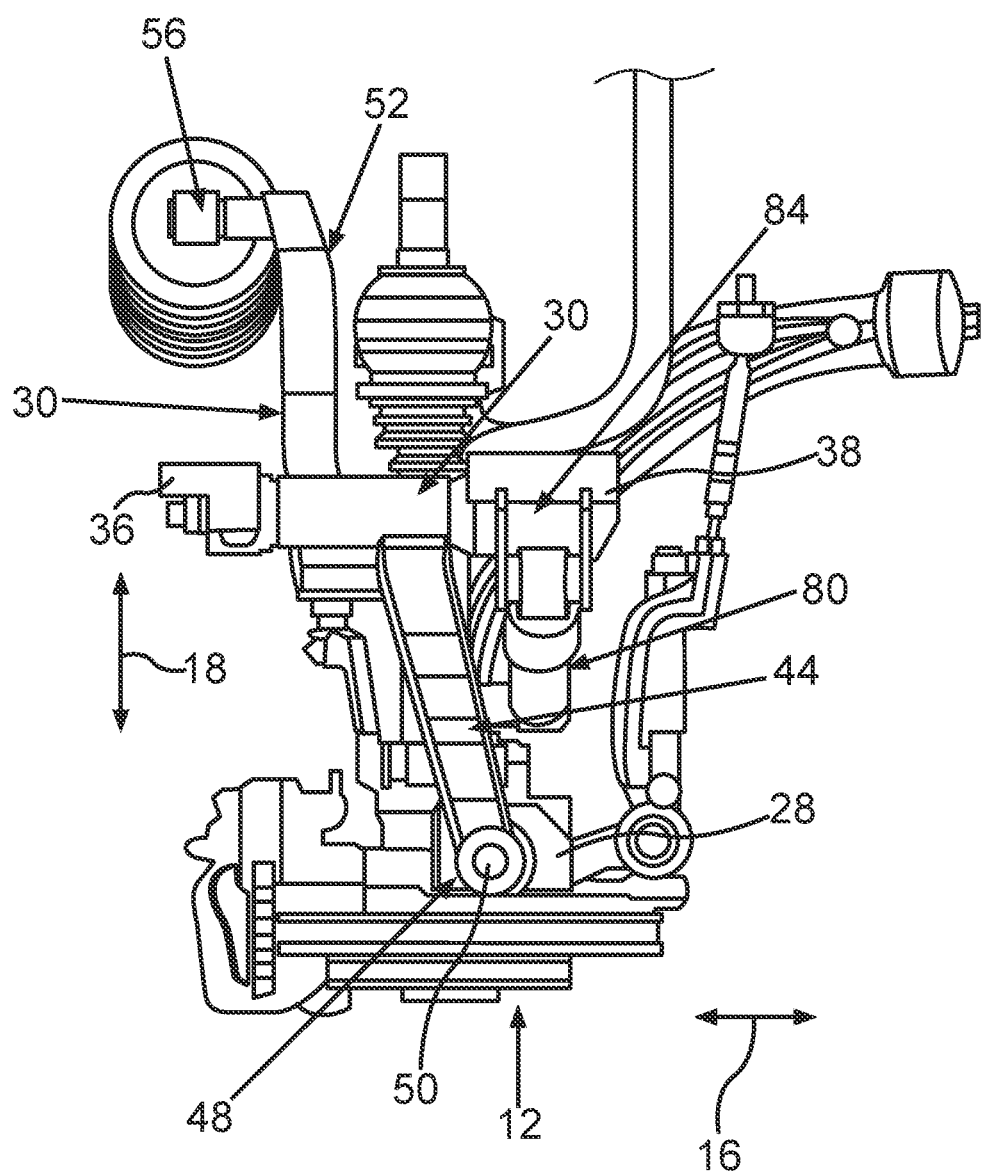
FIG. 8 is a schematic top view of the wheel suspension.
Figure 9:
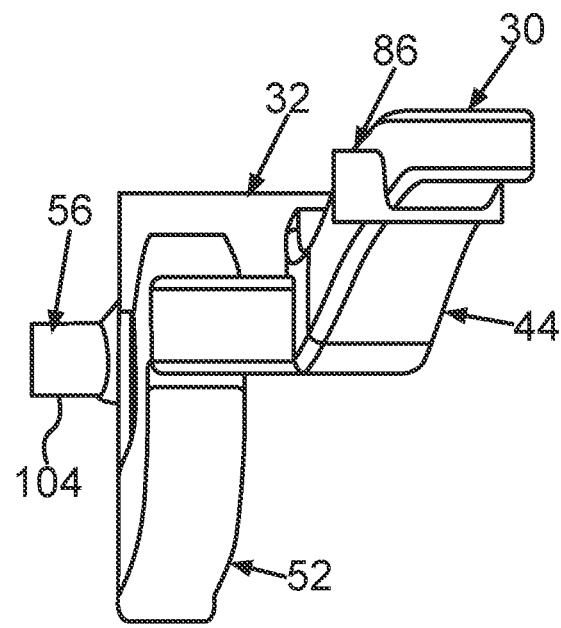
FIG. 9 is a schematic and perspective side view of a wheel linkage of the wheel suspension, wherein the wheel suspension is formed as a transverse linkage seesaw.
Figure 10:
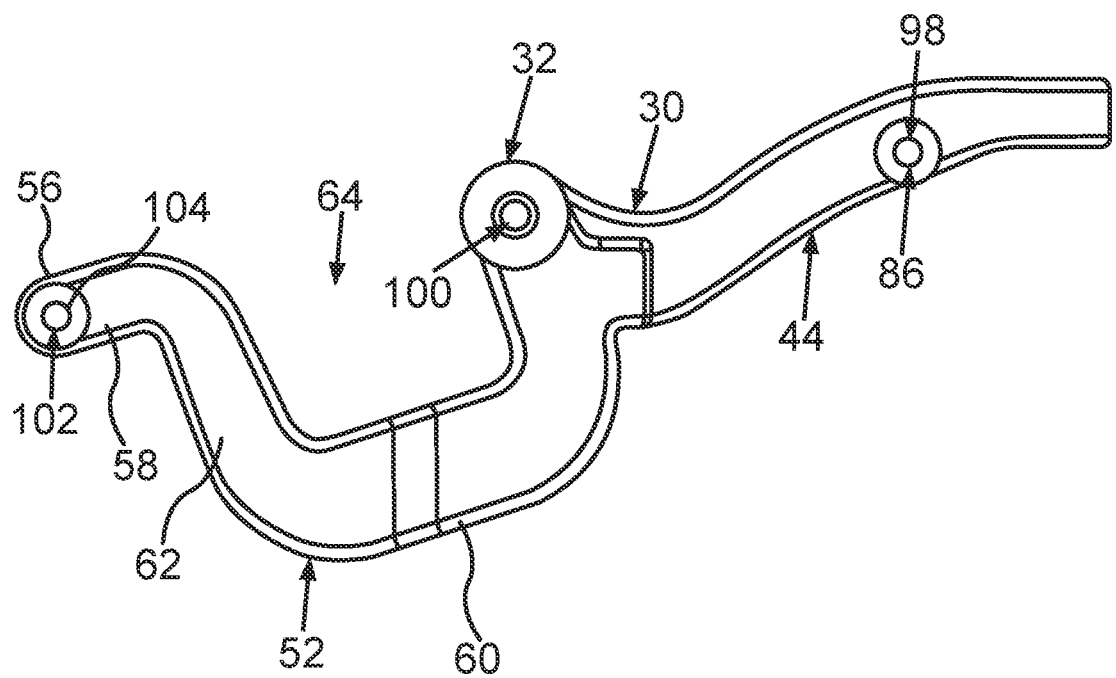
FIG. 10 is a schematic front view of the wheel linkage.
Figure 11:
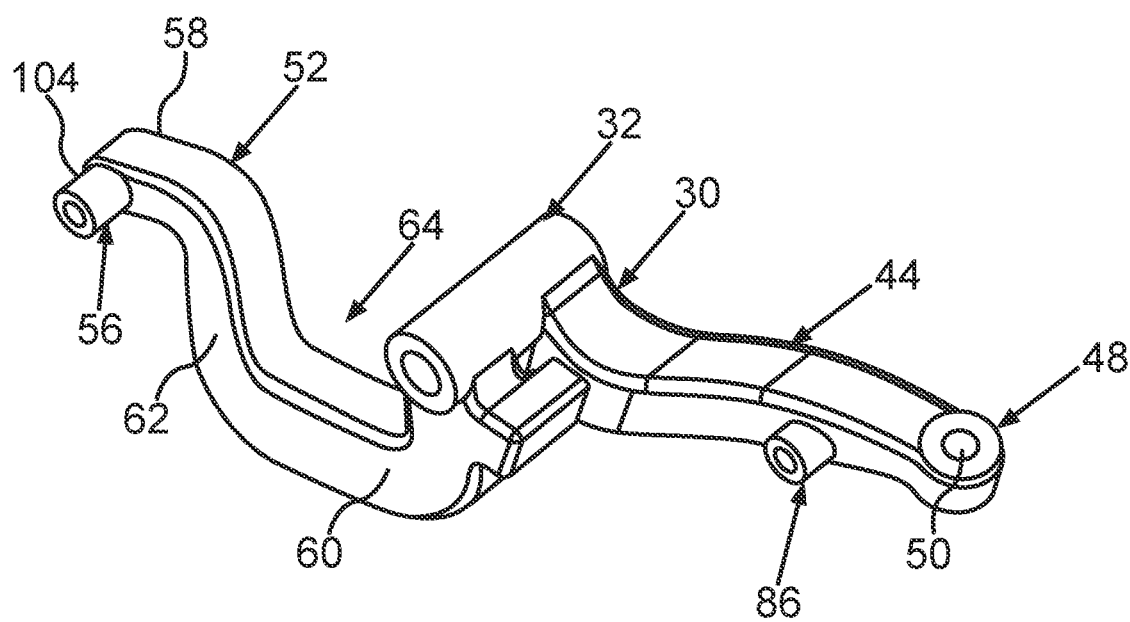
FIG. 11 is a schematic perspective view of the wheel linkage.
Figure 12:
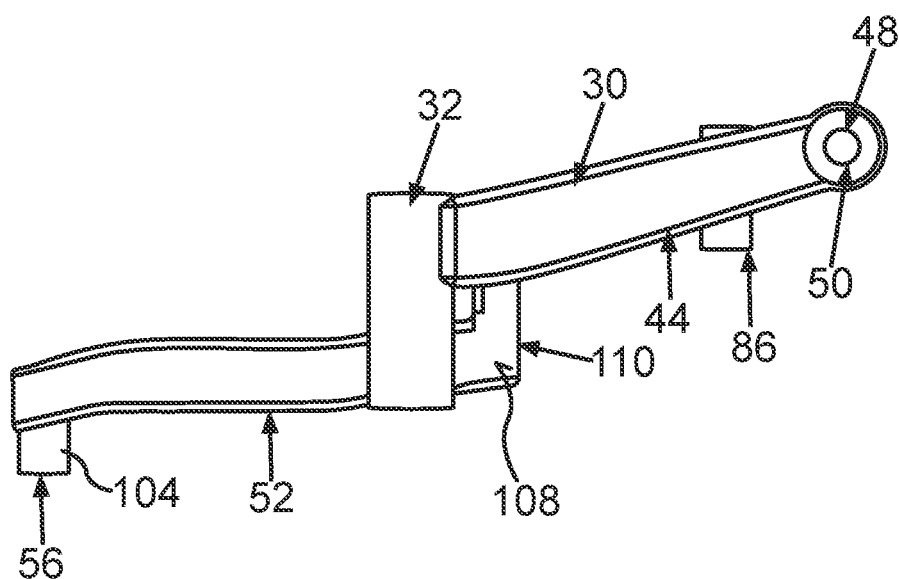
FIG. 12 is a schematic top view of the wheel linkage.
Figure 13:
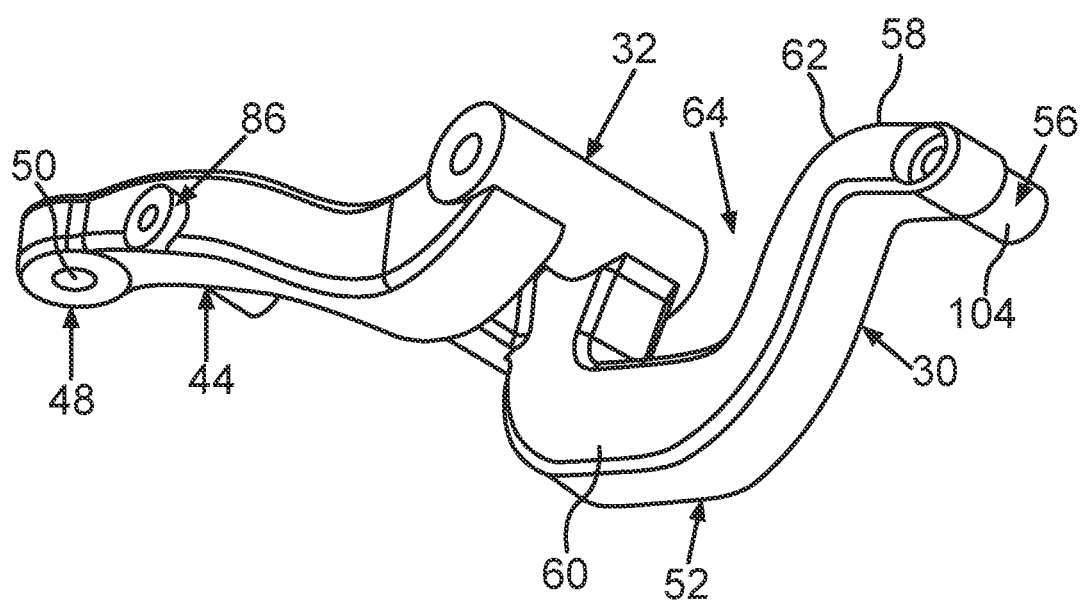
FIG. 13 is a further schematic perspective view of the wheel linkage.

FIGS. 7 and 8 show further schematic views of the wheel suspension 12. The wheel link 30 and its design can be seen particularly well in FIGS. 9 to 13. It can be seen particularly well in FIG. 10 that the coupling point 86 has a receiver 98 formed, for example, as a passage opening, in which at least one coupling element can be received or is received at least partially, in particular at least extensively or completely. The rotary rod assembly 88 is coupled, in particular flexibly, to the wheel linkage 30 via the coupling element. The bearing receiver of the bearing region 32, formed, for example, as a passage opening, can also be seen in FIG. 10 and is labelled there with 100. The connecting element 65 also has, for example, a receiver 102 formed as a passage opening. For example, the connecting element 56 forms an axle 104 on which the spring element 42 can be pivotably or rotatably held or mounted, in particular by using the spring plate 96.

Moreover, it can be seen in FIG. 12 that the connecting element 48 has the bearing receiver mentioned above and labelled with 106 in FIG. 12 and formed, for example, as a passage opening, via which bearing receiver the wheel support 28 can be flexibly connected to the wheel linkage 30. The passage openings or bearings or bearing receivers are formed, for example, to be at least substantially circular on the side of the inner periphery. The respective axial directions of the bearing receiver 100, the receiver 102 or the axle 104 and the passage openings run, for example, at least substantially in parallel to one another and perpendicularly to the axial direction of the bearing receiver 106.

Moreover, it can be seen from FIGS. 9 to 13 that the wheel linkage 30 has a support element 110 forming a support surface 108. The support element 110 serves as an additional support for link arms 44 and 52 formed as seesaw arms, in order to implement a torsional relief of the pivot axis 34, also referred to as seesaw axis, or the bearing region 32. Moreover, it can be seen that the receiver 64 is formed by an offset of the wheel link 30. The offset is provided for the longitudinal bearing 22, so that it can extend through the receiver 64 in the longitudinal direction of the vehicle or in the longitudinal extension direction of the vehicle.

The invention claimed is:

1. A wheel suspension (12) for a motor vehicle, comprising:
- a first wheel linkage (30) for guiding a wheel of the motor vehicle;
- wherein the first wheel linkage (30) has a bearing region (32) via which the first wheel linkage (30) is mountable at least indirectly on a body of the motor vehicle pivotably around a pivot axis (34) in relation to the body and has a spring element via which the first wheel linkage (30) is supportable in a sprung manner on the body;
- wherein the first wheel linkage (30) has:
    - a first linkage arm (44) extending in a first direction (46) away from the bearing region (32), wherein the first linkage arm (44) has a first connecting element (48) via which a wheel carrier (28) is flexibly connectable to the first linkage arm (44); and
    - a second linkage arm (52) extending in a second direction (54) that is opposite the first direction (46) and extending away from the bearing region (32), wherein the second linkage arm (52) has a second connecting element (56) via which the spring element (42) is flexibly connectable to the second linkage arm (52), wherein the second linkage arm (52) has a first longitudinal region (58) having the second connection element (56) and a second longitudinal region (60) attached to the first longitudinal region (58) and disposed between the bearing region (32) and the first longitudinal region (58), and wherein the second longitudinal region (60) is offset in relation to the bearing region (32) and the first longitudinal region (58) downwardly in a vertical direction of the motor vehicle in an installation position of the wheel suspension (12).

2. The wheel suspension (12) according to claim 1, wherein the first linkage arm (44) and/or the second linkage arm (52) run obliquely to a transverse direction (18) of the motor vehicle in the installation position of the wheel suspension (12).

3. The wheel suspension (12) according to claim 1, wherein the first linkage arm (44) arises from the bearing region (32) in a first root region (66), wherein the second linkage arm (52) arises from the bearing region (32) in a second root region (68), and wherein the first and second root regions (66, 68) are arranged following on from one another in a longitudinal direction (16) of the motor vehicle in the installation position of the wheel suspension (12).

4. The wheel suspension (12) according to claim 3, wherein the first and second root regions (66, 68) are arranged at a same height in the vertical direction of the motor vehicle in the installation position of the wheel suspension (12).

5. The wheel suspension (12) according to claim 1, further comprising a second wheel linkage (70), which is formed separately from the first wheel linkage (30), for guiding the wheel of the motor vehicle and is arranged below the first wheel linkage (30) in the vertical direction of the motor vehicle in the installation position of the wheel suspension (12).

6. The wheel suspension (12) according to claim 5, wherein the second wheel linkage (70) is formed as a triangular linkage.

7. A motor vehicle, comprising:
- a body;
- a wheel; and
- a wheel suspension (12), wherein the wheel suspension (12) includes:
    - a wheel linkage (30) for guiding the wheel;
    - wherein the wheel linkage (30) has a bearing region (32) via which the wheel linkage (30) is mounted at least indirectly on the body pivotably around a pivot axis (34) in relation to the body;
    - a spring element via which the wheel linkage (30) is supported in a sprung manner on the body; and
    - a wheel carrier (28) on which the wheel is rotatably mounted;
    - wherein the wheel linkage (30) has:
        - a first linkage arm (44) extending in a first direction (46) away from the bearing region (32), wherein the first linkage arm (44) has a first connecting element (48) via which the wheel carrier (28) is flexibly connected to the first linkage arm (44); and
        - a second linkage arm (52) extending in a second direction (54) that is opposite the first direction (46) and extending away from the bearing region (32), wherein the second linkage arm (52) has a second connecting element (56) via which the spring element (42) is flexibly connected to the second linkage arm (52), wherein the second linkage arm (52) has a first longitudinal region (58) having the second connection element (56) and a second longitudinal region (60) attached to the first longitudinal region (58) and disposed between the bearing region (32) and the first longitudinal region (58), and wherein the second longitudinal region (60) is offset in relation to the bearing region (32) and the first longitudinal region (58) downwardly in a vertical direction of the motor vehicle in an installation position of the wheel suspension (12).

8. The motor vehicle according to claim 7, wherein a transition region (62) is disposed between the second longitudinal region (60) and the first longitudinal region (58) via which transition region (62) the second longitudinal region (60) is connected to the first longitudinal region (58), wherein the transition region (62) and the bearing region (32) delimit a receiver (64) of the wheel linkage (30) in a transverse direction of the motor vehicle, wherein the receiver (64) is delimited downwardly by the second longitudinal region (60) in the vertical direction of the motor vehicle, and wherein a longitudinal support (22) of the motor vehicle extends through the receiver (64).

* * * * *